US011856521B2

(12) United States Patent
Li et al.

(10) Patent No.: US 11,856,521 B2
(45) Date of Patent: *Dec. 26, 2023

(54) SYSTEM INFORMATION UPDATING METHOD, APPARATUS, AND SYSTEM

(71) Applicant: Huawei Technologies Co., Ltd., Shenzhen (CN)

(72) Inventors: Jianhui Li, Shenzhen (CN); Zhenguo Du, Shenzhen (CN); Hongcheng Zhuang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/871,641

(22) Filed: Jul. 22, 2022

(65) Prior Publication Data

US 2023/0008676 A1 Jan. 12, 2023

Related U.S. Application Data

(63) Continuation of application No. 16/963,465, filed as application No. PCT/CN2019/072617 on Jan. 22, 2019, now Pat. No. 11,432,242.

(30) Foreign Application Priority Data

Feb. 1, 2018 (CN) .......................... 201810099650.4
Apr. 28, 2018 (CN) .......................... 201810404775.3

(51) Int. Cl.
*H04W 52/02* (2009.01)
*H04W 56/00* (2009.01)
(Continued)

(52) U.S. Cl.
CPC ... *H04W 52/0267* (2013.01); *H04W 52/0229* (2013.01); *H04W 56/001* (2013.01); *H04W 72/0453* (2013.01); *H04W 72/23* (2023.01)

(58) Field of Classification Search
CPC ........... H04W 56/001; H04W 56/0015; H04W 72/04; H04W 72/0406; H04W 72/042;
(Continued)

(56) References Cited

U.S. PATENT DOCUMENTS 8,411,620 B2 4/2013 Yuk et al.
11,109,212 B2 8/2021 Agiwal et al.
(Continued)

FOREIGN PATENT DOCUMENTS

CN 101212799 A 7/2008
CN 101877825 A 11/2010
(Continued)

OTHER PUBLICATIONS

Kamalinejad et al., "Wireless Energy Harvesting for the Internet of Things," pp. 102-108, Energy Harvesting Communications, IEEE Communications Magazine (Jun. 2015).
(Continued)

*Primary Examiner* — Chi H Pham
*Assistant Examiner* — Vladislav Y Agureyev
(74) *Attorney, Agent, or Firm* — Leydig, Voit & Mayer, Ltd.

(57) ABSTRACT

A system information updating method, a user equipment and a base station are provided, the method including: receiving, by the wake-up radio (WUR) interface of the user equipment, a wake-up signal sent by the base station, where the wake-up signal is used to wake up a main radio interface of the user equipment and instruct the main radio interface of the user equipment to receive updated system information, the wake-up signal includes system information (SI) update transmission control information, and the SI update transmission control information includes information required for receiving the updated system information; waking up, by the WUR interface of the user equipment, the
(Continued)

main radio interface of the user equipment; and receiving, by the user equipment according to the SI update transmission control information through the woken-up main radio interface, the updated system information sent by the base station.

20 Claims, 8 Drawing Sheets

(51) Int. Cl.
 *H04W 72/0453* (2023.01)
 *H04W 72/23* (2023.01)
(58) Field of Classification Search
 CPC ... H04W 72/0453; H04W 52/02–0209; H04W 52/0212–0219; H04W 52/0222–0229; H04W 52/0251–0258; H04W 52/0261–0267
 See application file for complete search history.

(56) References Cited

U.S. PATENT DOCUMENTS

| | | | |
|---|---|---|---|
| 11,184,846 B2* | 11/2021 | Kim | H04W 52/0206 |
| 11,219,069 B2 | 1/2022 | Agiwal et al. | |
| 2009/0274134 A1 | 11/2009 | Wang et al. | |
| 2011/0051668 A1 | 3/2011 | Lee et al. | |
| 2012/0044836 A1* | 2/2012 | Sivavakeesar | H04W 24/02 370/255 |
| 2013/0044661 A1* | 2/2013 | Jokimies | H04W 52/0274 370/311 |
| 2014/0302855 A1 | 10/2014 | Nory et al. | |
| 2015/0323984 A1* | 11/2015 | Ganton | G06F 1/28 713/323 |
| 2016/0316431 A1 | 10/2016 | Zhu et al. | |
| 2016/0345296 A1 | 11/2016 | Xu et al. | |
| 2017/0127470 A1 | 5/2017 | Vajapeyam et al. | |
| 2017/0150428 A1 | 5/2017 | Nory et al. | |
| 2018/0018185 A1 | 1/2018 | Sun et al. | |
| 2018/0020501 A1 | 1/2018 | Aboul-Magd et al. | |
| 2018/0092036 A1* | 3/2018 | Azizi | H04W 12/069 |
| 2018/0206193 A1 | 7/2018 | Adachi et al. | |
| 2018/0324700 A1 | 11/2018 | Yu et al. | |
| 2018/0376419 A1 | 12/2018 | Li et al. | |
| 2019/0007892 A1 | 1/2019 | Sheik et al. | |
| 2019/0045481 A1* | 2/2019 | Sang | H04W 76/14 |
| 2019/0150114 A1 | 5/2019 | Liu et al. | |
| 2019/0268192 A1* | 8/2019 | Lim | H04L 5/0092 |
| 2019/0289549 A1 | 9/2019 | Lim et al. | |
| 2019/0320389 A1 | 10/2019 | Alanen et al. | |
| 2019/0327672 A1 | 10/2019 | Hwang et al. | |
| 2019/0349926 A1 | 11/2019 | Alanen et al. | |
| 2019/0364503 A1 | 11/2019 | Kasslin et al. | |
| 2020/0035390 A1* | 1/2020 | Hu | B60F 3/00 |
| 2020/0037250 A1 | 1/2020 | Kim et al. | |
| 2020/0084718 A1 | 3/2020 | Wilhelmsson et al. | |
| 2020/0120607 A1* | 4/2020 | Kim | H04W 76/28 |
| 2020/0178171 A1 | 6/2020 | Lou et al. | |
| 2020/0178176 A1 | 6/2020 | Kim et al. | |
| 2020/0187120 A1 | 6/2020 | Alanen et al. | |
| 2020/0229095 A1 | 7/2020 | Shrestha et al. | |
| 2020/0245238 A1* | 7/2020 | Kim | H04W 52/0219 |
| 2020/0267670 A1 | 8/2020 | Astrom et al. | |
| 2020/0280479 A1* | 9/2020 | Wilhelmsson | H04L 27/3809 |
| 2020/0314752 A1 | 10/2020 | Haque et al. | |
| 2020/0367199 A1 | 11/2020 | Bhatoolaul et al. | |
| 2021/0105599 A1 | 4/2021 | Mu | |
| 2021/0136687 A1 | 5/2021 | Liu et al. | |
| 2021/0227466 A1 | 7/2021 | Kim et al. | |
| 2021/0227469 A1* | 7/2021 | Kim | H04W 56/001 |
| 2021/0314869 A1 | 10/2021 | Ye et al. | |
| 2022/0201649 A1* | 6/2022 | Cox | H04W 52/0235 |
| 2022/0295403 A1* | 9/2022 | Shrestha | H04W 52/0216 |

FOREIGN PATENT DOCUMENTS

| | | | |
|---|---|---|---|
| CN | 103636264 A | | 3/2014 |
| CN | 104219743 A | | 12/2014 |
| CN | 104919861 A | | 9/2015 |
| CN | 105340334 A | | 2/2016 |
| CN | 107295615 A | | 10/2017 |
| CN | 105052178 B | | 10/2019 |
| EP | 1768442 A2 | | 3/2007 |
| EP | 3711370 A1 | | 9/2020 |
| WO | 2017121070 A1 | | 7/2017 |
| WO | WO-2018203904 A1 | * | 11/2018 |
| WO | 2019068224 A1 | | 4/2019 |
| WO | 2019094494 A1 | | 5/2019 |

OTHER PUBLICATIONS

"Cell search and system information acquisition improvements in eFeMTC," 3GPP TSG RAN WG1 Meeting #91, Reno, USA, R1-1719461, total 5 pages, 3rd Generation Partnership Project, Valbonne, France (Nov. 27-Dec. 1, 2017).

"Reducing system acquisition time for efeMTC," 3GPP TSG RAN WG1 Meeting #90-bis, Prague, Czech Republic, R1-1717220, total 3 pages, 3rd Generation Partnership Project, Valbonne, France (Oct. 9-13, 2017).

* cited by examiner

SYSTEM INFORMATION UPDATING METHOD, APPARATUS, AND SYSTEM

CROSS-REFERENCE TO RELATED APPLICATIONS

This application is a continuation application of U.S. patent application Ser. No. 16/963,465, filed on Jul. 20, 2020, which is a national stage application of International Application No. PCT/CN2019/072617, filed on Jan. 22, 2019, which claims priority to Chinese Patent Application No. 201810099650.4, filed on Feb. 1, 2018 and Chinese Patent Application No. 201810404775.3, filed on Apr. 28, 2018. All of the aforementioned applications are hereby incorporated by reference in their entireties.

TECHNICAL FIELD

Embodiments of this application relate to the field of information technologies, and in particular, to a system information updating method, an apparatus, and a system.

BACKGROUND

In the 3rd generation partnership project (3GPP) standard, user equipment (UE) is configured with a wake-up radio (WUR) interface on the basis of a traditional main radio interface, as shown in FIG. 1. The main radio interface is also called a main radio module, and the WUR interface is also called a WUR module. After the UE is configured with the WUR module, when the main radio module in an inactive state receives a trigger signal from the WUR module, the main radio module enters an active state, and then the UE performs data communication with a base station through the main radio module. The trigger signal is an internal signal of the UE and can be transmitted wiredly or wirelessly.

In the prior art, in a long term evolution (LTE) system, when system information of a cell changes, a base station needs to broadcast the change of the system information to UE, and a main radio module of the UE undergoes three steps: reception of a paging message, reception of a system information block (SIB) 1, and reception of SIBs 2 to 21, to update the system information. The SIBs 2 to 21 may be called other system information (OSI) in a new radio (NR) system, and a quantity of system information blocks included in the OSI is less than or equal to a quantity of the SIBs 2 to 21. Each step undergoes corresponding downlink control information (DCI) blind detection with high power consumption. In addition, as the UE is configured with a WUR module, if the WUR module is in an active state, the UE may be out of synchronization due to crystal frequency drift, so that the UE is unable to receive a message from the base station in a paging window known to both the UE and the base station. Therefore, before the main radio module of the UE is woken up by the base station for updating the system information, cell synchronization also needs to be performed, which further increases power consumption of the UE and increases latency. System information of an NR system is supposed to be updated more frequently than that of an LTE system, and therefore power consumption of UE in the NR system is greater than that of UE in the LTE system.

In conclusion, in the LTE or NR system, when UE is configured with a WUR module, how to reduce power consumption of the UE during system information updating is a problem that needs to be resolved for now.

SUMMARY

Embodiments of this application provide a system information updating method, an apparatus, and a system, to resolve a prior-art problem that UE consumes a large amount of power during system information updating when the UE is configured with a WUR module.

According to a first aspect, embodiments of this application provide a system information updating method. The method includes: sending, by a base station, a wake-up signal to a wake-up radio WUR interface of user equipment, and waking up, by the user equipment, a main radio interface of the user equipment after the WUR interface of the user equipment receives the wake-up signal, where the wake-up signal is used to instruct the user equipment to wake up the main radio interface of the user equipment and instruct the main radio interface of the user equipment to receive updated system information, the wake-up signal includes system information SI update transmission control information, and the SI update transmission control information includes information required for receiving the updated system information; and sending, by the base station, the updated system information to the main radio interface, and receiving, by the user equipment according to the SI update transmission control information through the woken-up main radio interface, the updated system information sent by the base station.

In this method, the WUR interface of the user equipment receives the wake-up signal sent by the base station, and wakes up the main radio interface of the user equipment based on the wake-up signal. After being activated, the main radio interface receives, according to the system information SI update transmission control information carried in the wake-up signal, the updated system information sent by the base station. Because the system information SI update transmission control information carries information required for the updated system information, the user equipment may receive, according to the required information, the updated system information, that is, an updated SIB 1 (with no blind check needed in the step of receiving the updated SIB 1). In this way, there is no need to go through a large quantity of blind detection processes in two prior-art steps of performing blind detection to receive a paging message and then performing blind detection to receive the SIB 1, reducing power consumption of the user equipment.

In a possible design, the SI update transmission control information includes frequency domain resource information required for receiving the updated system information.

In this method, the user equipment receives, according to the frequency domain resource information through the woken-up main radio interface, the updated system information sent by the base station.

In a possible design, the SI update transmission control information further includes at least one of the following information: time domain resource information required for receiving the updated system information, and modulation and coding scheme information required for receiving the updated system information.

In this method, the user equipment receives, according to the time domain resource information and the modulation and coding scheme information through the woken-up main radio interface, the updated system information sent by the base station.

In a possible design, the wake-up signal is a synchronization frame and/or a wake-up frame, where the wake-up frame is a broadcast frame, a unicast frame, or a multicast frame.

In a possible design, when the wake-up signal is the wake-up frame, that the WUR interface of the user equipment receives the wake-up signal sent by the base station includes: receiving, by the WUR interface of the user equipment, the wake-up frame sent by the base station, where the wake-up frame includes the SI update transmission control information.

In this method, the wake-up frame received by the user equipment includes the SI update transmission control information.

In a possible design, the wake-up frame further includes an SI update indication, and the SI update indication is used to indicate that system information has been updated.

In this method, the user equipment determines, based on the received SI update indication, that system information has been updated, and then receives the updated system information according to the information required for the updated system information carried in the SI update transmission control information.

In a possible design, when the wake-up signal is the synchronization frame and the wake-up frame, that the WUR interface of the user equipment receives the wake-up signal sent by the base station includes: receiving, by the WUR interface of the user equipment, the synchronization frame sent by the base station, where the synchronization frame includes the SI update transmission control information; and after the WUR interface of the user equipment receives the synchronization frame sent by the base station, receiving, by the WUR interface of the user equipment, the wake-up frame sent by the base station, where the wake-up frame includes an SI update indication, and the SI update indication is used to indicate that system information has been updated.

In this method, the SI update transmission control information required by the user equipment is sent by using the synchronization frame, the SI update indication is sent by using the wake-up frame, and the updated system information is received according to the received SI update transmission control information and the SI update indication.

In a possible design, when the wake-up signal is the synchronization frame, that the WUR interface of user equipment receives the wake-up signal sent by the base station includes: receiving, by the WUR interface of the user equipment, the synchronization frame sent by the base station, where the synchronization frame includes the SI update transmission control information.

In this method, the user equipment receives the updated system information based on the received SI update transmission control information.

In a possible design, the synchronization frame further includes an SI update indication, and the SI update indication is used to indicate that system information has been updated.

In this method, the user equipment determines, based on the received SI update indication, that system information has been updated, and then receives the updated system information according to the information required for the updated system information carried in the SI update transmission control information.

In a possible design, the SI update indication is carried by a counter counter field in the synchronization frame, and a value of the counter field is used to indicate that system information has been updated.

In this method, using the counter field to indicate that system information has been updated is to explicitly inform the user equipment that system information has been updated.

According to a second aspect, embodiments of this application provide a system information updating method, including: sending, by a base station, a wake-up signal to a wake-up radio WUR interface of user equipment, where the wake-up signal is used to instruct the user equipment to wake up a main radio interface of the user equipment and instruct the main radio interface of the user equipment to receive updated system information, the wake-up signal includes system information SI update transmission control information, and the SI update transmission control information includes information required for receiving the updated system information; and sending, by the base station, the updated system information to the woken-up main radio interface of the user equipment.

In a possible design, the SI update transmission control information includes frequency domain resource information required for receiving the updated system information.

In a possible design, the SI update transmission control information further includes at least one of the following information: time domain resource information required for receiving the updated system information, and modulation and coding scheme information required for receiving the updated system information.

In a possible design, the wake-up signal is a synchronization frame and/or a wake-up frame, where the wake-up frame is a broadcast frame, a unicast frame, or a multicast frame.

In a possible design, when the wake-up signal is the wake-up frame, the sending, by a base station, a wake-up signal to a wake-up radio WUR interface of user equipment includes: sending, by the base station, the wake-up frame to the WUR interface of the user equipment, where the wake-up frame includes the SI update transmission control information.

In a possible design, the wake-up frame further includes an SI update indication, and the SI update indication is used to indicate that system information has been updated.

In a possible design, when the wake-up signal is the synchronization frame and the wake-up frame, the sending, by a base station, a wake-up signal to a wake-up radio WUR interface of user equipment includes:

sending, by the base station, the synchronization frame to the WUR interface of the user equipment, where the synchronization frame includes the SI update transmission control information; and after the base station sends the synchronization frame to the WUR interface of the user equipment, sending, by the base station, the wake-up frame to the WUR interface of the user equipment, where the wake-up frame includes an SI update indication, and the SI update indication is used to indicate that system information has been updated.

In a possible design, when the wake-up signal is the synchronization frame, the sending, by a base station, a wake-up signal to a wake-up radio WUR interface of user equipment includes: sending, by the base station, the synchronization frame to the WUR interface of the user equipment, where the synchronization frame includes the system information SI update transmission control information.

In a possible design, the synchronization frame further includes an SI update indication, and the SI update indication is used to indicate that system information has been updated.

In a possible design, the SI update indication is carried by a counter counter field in the synchronization frame, and a value of the counter field is used to indicate that system information has been updated.

In a third aspect, embodiments of this application provide user equipment, including: a WUR interface, configured to receive a wake-up signal sent by a base station, where the wake-up signal is used to instruct the user equipment to wake up a main radio interface of the user equipment and instruct the main radio interface of the user equipment to receive updated system information, the wake-up signal includes system information SI update transmission control information, and the SI update transmission control information includes information required for receiving the updated system information; a processing unit, configured to wake up the main radio interface of the user equipment after the WUR interface receives the wake-up signal; and the main radio interface, configured to receive, according to SI update transmission control information after being woken up, the updated system information sent by the base station.

In a possible design, the SI update transmission control information includes frequency domain resource information required for receiving the updated system information.

In a possible design, the SI update transmission control information further includes at least one of the following information: time domain resource information required for receiving the updated system information, and modulation and coding scheme information required for receiving the updated system information.

In a possible design, the wake-up signal is a synchronization frame and/or a wake-up frame, where the wake-up frame is a broadcast frame, a unicast frame, or a multicast frame.

In a possible design, when the wake-up signal is the wake-up frame, the WUR interface is specifically configured to:

receive the wake-up frame sent by the base station, where the wake-up frame includes the SI update transmission control information.

In a possible design, the wake-up frame further includes an SI update indication, and the SI update indication is used to indicate that system information has been updated.

In a possible design, when the wake-up signal is the synchronization frame and the wake-up frame, the WUR interface of the user equipment is specifically configured to:

receive the synchronization frame sent by the base station, where the synchronization frame includes the SI update transmission control information; and after the WUR interface of the user equipment receives the synchronization frame sent by the base station, receive, by the WUR interface of the user equipment, the wake-up frame sent by the base station, where the wake-up frame includes an SI update indication, and the SI update indication is used to indicate that system information has been updated.

In a possible design, when the wake-up signal is the synchronization frame, the WUR interface is specifically configured to:

receive the synchronization frame sent by the base station, where the synchronization frame includes the SI update transmission control information.

In a possible design, the synchronization frame further includes an SI update indication, and the SI update indication is used to indicate that system information has been updated.

In a possible design, the SI update indication is carried by a counter counter field in the synchronization frame, and a value of the counter field is used to indicate that system information has been updated.

According to a fourth aspect, embodiments of this application provide a base station, including: a first transceiver unit, configured to send a wake-up signal, where the wake-up signal is used to instruct user equipment to wake up a main radio interface of the user equipment and instruct the main radio interface of the user equipment to receive updated system information, the wake-up signal includes system information SI update transmission control information, and the SI update transmission control information includes information required for receiving the updated system information; and a second transceiver unit, configured to send the updated system information to the woken-up main radio interface of the user equipment.

In a possible design, the SI update transmission control information includes frequency domain resource information required for receiving the updated system information.

In a possible design, the SI update transmission control information further includes at least one of the following information: time domain resource information required for receiving the updated system information, and modulation and coding scheme information required for receiving the updated system information.

In a possible design, the wake-up signal is a synchronization frame and/or a wake-up frame, where the wake-up frame is a broadcast frame, a unicast frame, or a multicast frame.

In a possible design, when the wake-up signal is the wake-up frame, the first transceiver unit is specifically configured to:

send the wake-up frame to a WUR interface of the user equipment, where the wake-up frame includes the system information SI update transmission control information.

In a possible design, the wake-up frame further includes an SI update indication, and the SI update indication is used to indicate that system information has been updated.

In a possible design, when the wake-up signal is the synchronization frame and the wake-up frame, the first transceiver unit is specifically configured to:

send the synchronization frame to the WUR interface of the user equipment, where the synchronization frame includes the SI update transmission control information; and after the first transceiver unit sends the synchronization frame to the WUR interface of the user equipment, send, by the first transceiver unit, the wake-up frame to a WUR interface of the user equipment, where the wake-up frame includes an SI update indication, and the SI update indication is used to indicate that system information has been updated.

In a possible design, when the wake-up signal is the synchronization frame, the first transceiver unit is specifically configured to:

send the synchronization frame to a WUR interface of the user equipment, where the synchronization frame includes the system information SI update transmission control information.

In a possible design, the synchronization frame further includes an SI update indication, and the SI update indication is used to indicate that system information has been updated.

In a possible design, the SI update indication is carried by a counter counter field in the synchronization frame, and a value of the counter field is used to indicate that system information has been updated.

According to a fifth aspect, an embodiment of this application further provides a device, including a processor and a memory, where the memory is configured to store a software program, and the processor is configured to read the software program stored in the memory and implement the method provided in any one of the first aspect or the designs of the first aspect or any one of the second aspect or the designs of the second aspect.

According to a sixth aspect, an embodiment of this application further provides a computer-readable storage medium, configured to store a computer software instruction used for executing functions described in any one of the first aspect or the designs of the first aspect or any one of the second aspect or the designs of the second aspect, where the computer software instruction includes a program designed to execute the method provided in any one of the first aspect or the designs of the first aspect or any one of the second aspect or the designs of the second aspect.

According to a seventh aspect, an embodiment of this application further provides an apparatus, where the apparatus is connected to a memory, and is configured to read and execute a software program stored in the memory to implement any one of the first aspect or the designs of the first aspect or any one of the second aspect or the designs of the second aspect, and the apparatus is a chip or a chip system.

According to an eighth aspect, an embodiment of this application further provides a system, including user equipment and a base station that implement any one of the first aspect or the designs of the first aspect and any one of the second aspect or the designs of the second aspect.

DESCRIPTION OF EMBODIMENTS

Figure 1:
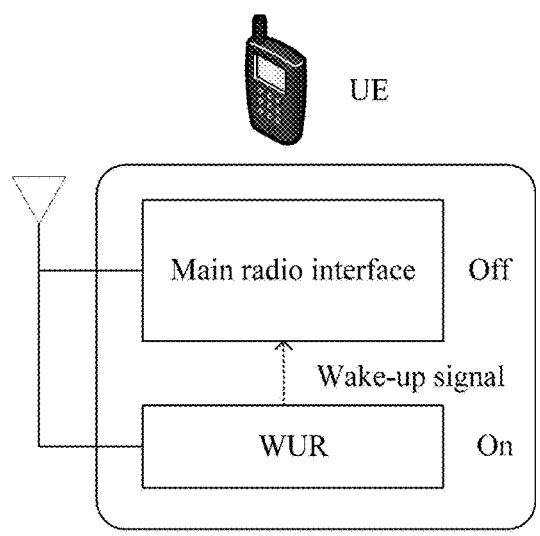
FIG. 1 is a schematic structural diagram of user equipment according to an embodiment of this application.

The following further describes in detail the embodiments of this application with reference to the accompanying drawings.

The embodiments of this application provide a system information updating method, an apparatus, and a system, to resolve a prior-art problem that UE consumes a large amount of power during system information updating when the UE is configured with a WUR module. The method and the device are based on a same inventive idea. Because principles of resolving problems according to the method and the device are similar, mutual reference may be made between implementations of the device and the method, and repeated content is not described redundantly.

In the following, some terms in the embodiments of this application are described, to help a person skilled in the art have a better understanding.

(1) User equipment (UE), also known as a terminal equipment, a mobile station (MS), a mobile terminal (MT), or the like, is a device that provides voice and/or data connectivity to users, for example, a handheld device, a vehicle-mounted device, or the like that has a wireless connection. Currently, some examples of the terminal are a mobile phone (mobile phone), a tablet, a laptop, a handheld computer, a mobile internet device (MID), a wearable device, a virtual reality (VR) device, an augmented reality (AR) device, a wireless terminal in industrial control, a wireless terminal in self-driving, a wireless terminal in remote medical surgery, and a wireless terminal in smart grid, a wireless terminal in transportation safety, a wireless terminal in smart city, and a wireless terminal in smart home. The UE in this application may be ultra-reliable and low-latency communications (URLLC) UE.

(2) A base station (BS) is a device in a network that connects a terminal device to a wireless network. The network device is a node in a wireless access network, and may also be referred to as a network device or a radio access network (RAN) node (or device). Currently, some examples of the network device are a gNB, a transmission reception point (TRP), an evolved NodeB (eNB), a radio network controller (RNC), a NodeB (NB), a base station controller (BSC), a base transceiver station (BTS), a home base station (for example, a home evolved NodeB, or a home Node B, HNB), a baseband unit (BBU), and a wireless fidelity (Wi-Fi) access point (AP). Additionally, in a network structure, the network device may include a centralized unit (CU) node and distributed unit (DU) nodes. This structure separates protocol layers of an eNB in a long term evolution (LTE) system. Some protocol layer functions are centrally controlled by the CU, and some or all of the remaining protocol layer functions are distributed in the DUs that are centrally controlled by the CU.

(3) A wake-up signal is a wake-up frame or a synchronization frame, and is used to instruct user equipment to wake up a main radio interface of the user equipment and instruct a main radio interface of the user equipment to receive updated system information. The wake-up signal may be sent by a base station or the user equipment.

(4) A wake-up radio WUR interface is a WUR interface introduced to a terminal device on the basis of a traditional main radio interface configured. The main radio interface is typically in an inactive state. When a wake-up signal is received from the WUR interface, the main radio interface is activated, and then the main radio interface and the base station perform data communication. The wake-up radio interface is also called a wake-up receiver.

(5) A main radio interface is used for data communication with a base station, and may also be called a main communications interface or a main radio module (for example, a Wi-Fi communications module), which is not limited in this application.

(6) System information SI update transmission control information includes information required for receiving updated system information, and specifically includes frequency domain resource information, time domain resource information, and modulation and coding scheme information that are required for receiving the updated system information. User equipment receives, according to the SI update transmission control information, the updated system information sent by a base station.

(7) A system information SI update indication indicates that system information has been updated.

(8) A counter counter field is used to explicitly wake up user equipment.

(9) "A plurality of" refers to two or more than two.

In addition, it should be understood that in the descriptions of embodiments of this application, the words "first" and "second" are used only for the purpose of distinguishing descriptions, and should not be understood as indicating or implying any relative importance, nor as indicating or imply any order.

Figure 2:
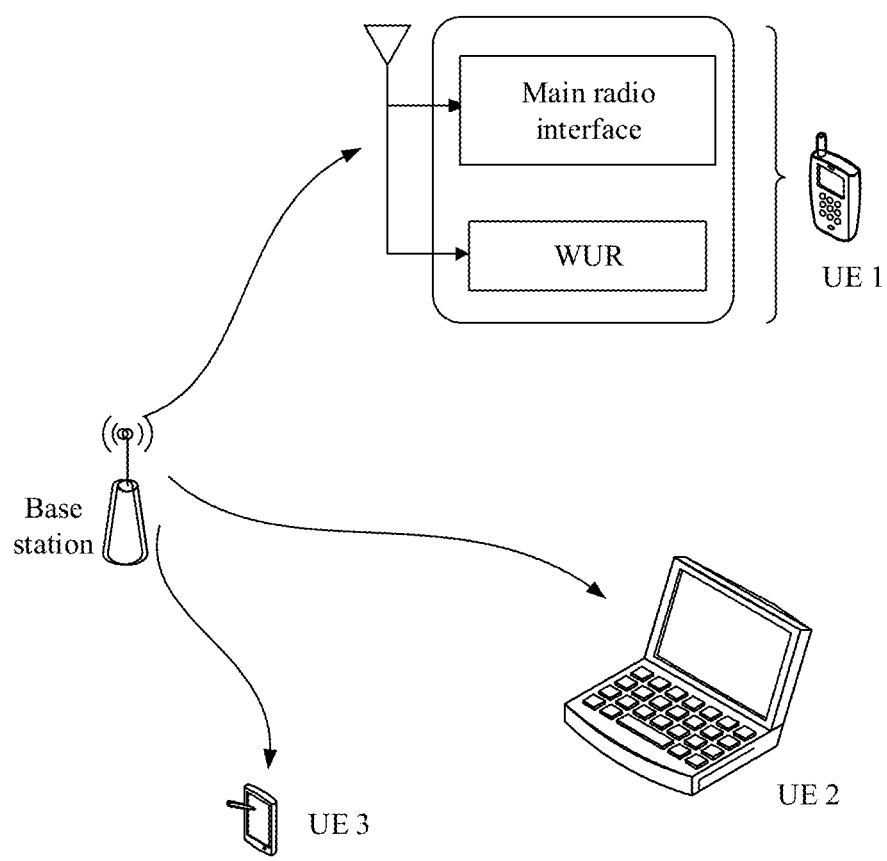
FIG. 2 is a schematic diagram illustrating a scenario of a wireless communications system according to an embodiment of this application.

Embodiments of this application can be applied to a scenario of a wireless communications system shown in FIG. 2. A base station can perform data transmission with a plurality of UEs and can send wake-up signals. UE configured with a WUR interface and a main radio interface, and receives, through the WUR interface, a wake-up signal sent by the base station. In this embodiment of this application, the wake-up signal may be sent by the base station, and received by a terminal device equipped with a WUR interface, for example, a mobile phone or a sensor; or the wake-up signal may be sent by a terminal device such as a mobile phone, and received by another terminal device equipped with a WUR interface, for example, a smartwatch or a bracelet; or the wake-up signal may be sent by a terminal device such as a mobile phone, and received by a base station equipped with a WUR interface; or the wake-up signal may be sent by a terminal device such as a smart watch or a bracelet, and received by a terminal device equipped with a WUR interface, for example, a mobile phone. In conclusion, a sending end of the wake-up signal should have a capability of sending a wake-up signal, and a receiving end should be equipped with a WUR interface to receive the wake-up signal. The wake-up signal is a collective term for all signals that can be received and decoded by the WUR interface. For example, the wake-up signal may be a wake-up frame or other frames, which is not limited in this application.

Figure 3:
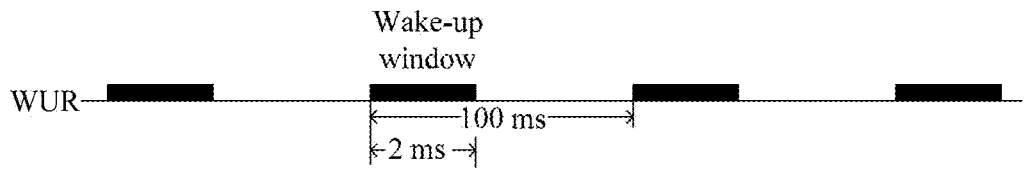
FIG. 3 is a schematic diagram of a WUR interface in an intermittently activated state according to an embodiment of this application.

In this embodiment of this application, the WUR interface is in an activated state or intermittently activated state as shown in FIG. 3. When the WUR interface is in an intermittently activated state, the wake-up signal is only received within a time period corresponding to a wake-up window. This can further reduce power consumption of the UE.

The following provides a detailed description of the system information updating scheme in this application with reference to the drawings.

Figure 4:
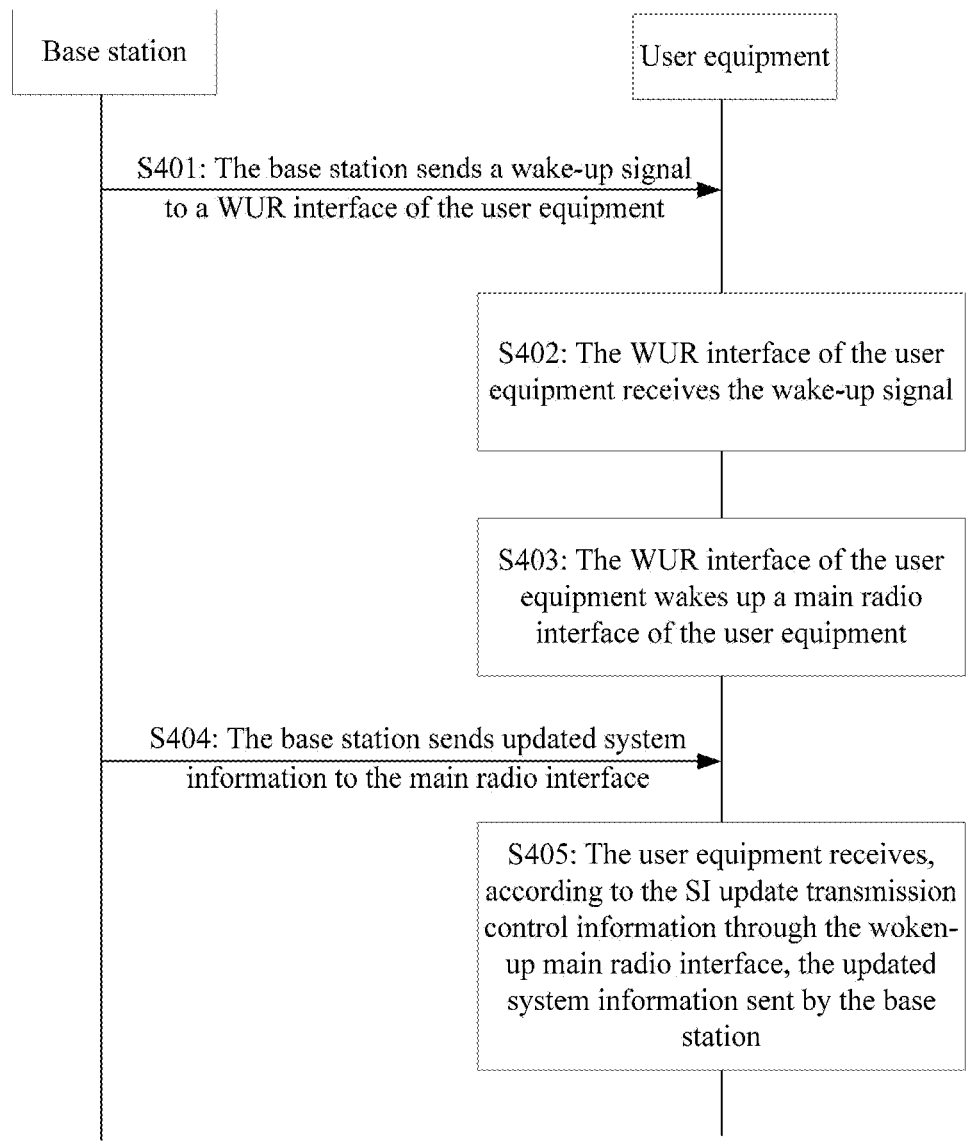
FIG. 4 is a flowchart of a system information updating method according to an embodiment of this application.

FIG. 4 shows a system information updating method provided in an embodiment of this application, which is specifically described by using an example in which a base station is a sending end and user equipment is a receiving end. FIG. 4 is a flowchart of the system information updating method. The method includes the following steps.

Step S401: The base station sends a wake-up signal to a WUR interface of the user equipment, where the wake-up signal is used to wake up a main radio interface of the user equipment and instruct the main radio interface of the user equipment to receive updated system information, the wake-up signal includes system information SI update transmission control information, and the SI update transmission control information includes information required for receiving the updated system information.

Specifically, the SI update transmission control information includes frequency domain resource information required for receiving the updated system information, and the SI update transmission control information further includes at least one of the following information: time domain resource information required for receiving the updated system information, and modulation and coding scheme information required for receiving the updated system information.

Step S402: The WUR interface of the user equipment receives the wake-up signal.

Step S403: The WUR interface of the user equipment wakes up the main radio interface of the user equipment.

Step S404: The base station sends the updated system information to the main radio interface.

Step S405: The user equipment receives, according to the SI update transmission control information through the woken-up main radio interface, the updated system information sent by the base station.

In the foregoing method, the WUR interface of the user equipment receives the wake-up signal sent by the base station, and wakes up the main radio interface of the user equipment based on the wake-up signal. After being activated, the main radio interface receives, according to the system information SI update transmission control information carried in the wake-up signal, the updated system information sent by the base station. Because the system information SI update transmission control information carries the information required for the updated system information, the user equipment may receive the updated system information, that is, an updated SIB 1, according to the required information. In this way, there is no need to go through a large quantity of blind detection processes in two prior-art steps of performing blind detection to receive a paging message and then performing blind detection to receive the SIB 1, reducing power consumption of the user equipment.

In a possible implementation, after step S402, the base station receives feedback information sent by the WUR interface.

Specifically, the feedback information may be one ACK feedback or a group of ACK feedbacks.

In this embodiment of this application, the wake-up signal is a synchronization frame and/or a wake-up frame, where the wake-up frame is a broadcast frame, a unicast frame, or a multicast frame, that is, the wake-up signal may be a synchronization frame, a wake-up frame, or a synchronization frame and a wake-up frame. The following gives examples of the three cases for description.

Case 1: When the wake-up signal is the wake-up frame, the WUR interface of the user equipment receives the wake-up frame sent by the base station, where the wake-up frame includes the SI update transmission control information.

Figure 5:
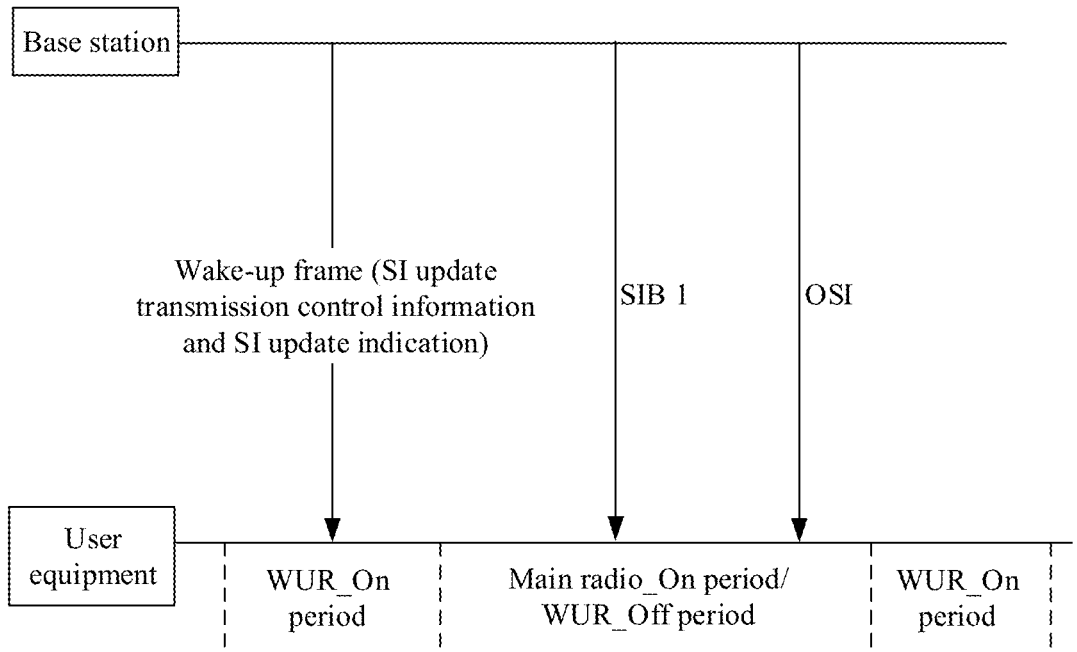
FIG. 5 is a flowchart of another system information updating method according to an embodiment of this application.

Specifically, a system information updating interaction process between the base station and the user equipment in Case 1 may be shown in FIG. 5.

The WUR interface, in an active state, of the user equipment receives, within a period, the wake-up frame sent by the base station, and wakes up the main radio interface of the user equipment. The user equipment receives, within the period in which the main radio interface is in the active state, the updated system information sent by the base station. The updated system information includes a system information block (SIB) 1, and other system information (OSI). The OSI refers to SIBs 2 to 21, and the WUR interface is in an inactive state when the main radio interface is in the active state. In this way, power consumption of the UE is reduced. The active state may be represented by an on state, and the inactive state may be represented by an off state.

Optionally, the wake-up frame further includes an SI update indication, and the SI update indication is used to indicate that system information has been updated. Specifically, if the wake-up frame includes this field (that is, includes the SI update indication), the indication is an explicit indication that the UE needs to wake up the main radio interface and update the system information; or if the wake-up frame does not include this field, the indication is an implicit indication, and the UE needs to wake up the main radio interface and update the system information once the wake-up frame includes the SI update transmission control information. The wake-up frame may be a broadcast frame, or may be a multicast frame or a unicast frame, which is not limited in this embodiment of this application.

Case 2: When the wake-up signal is the synchronization frame and the wake-up frame, the WUR interface of the user equipment receives the synchronization frame sent by the base station. The synchronization frame includes the SI update transmission control information. After the WUR interface of the user equipment receives the synchronization frame sent by the base station, the WUR interface of the user equipment receives the wake-up frame sent by the base station. The wake-up frame includes an SI update indication, and the SI update indication is used to indicate that system information has been updated.

Figure 6:
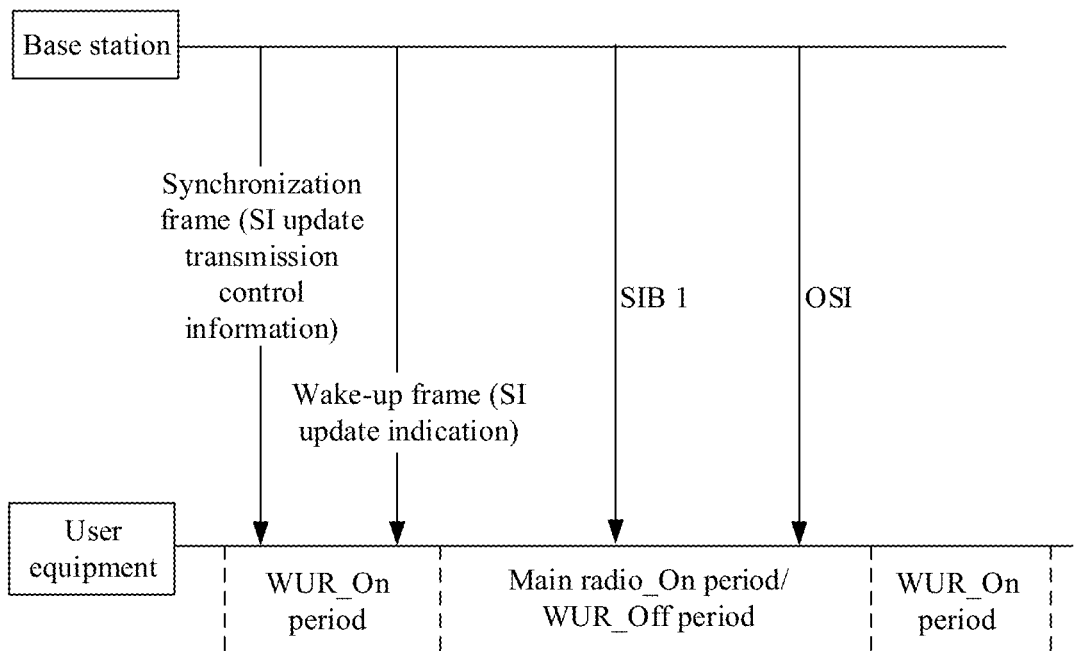
FIG. 6 is a flowchart of still another system information updating method according to an embodiment of this application.

Specifically, a system information updating interaction process between the base station and the user equipment in Case 1 may be shown in FIG. 6.

The WUR interface, in an active state, of the user equipment receives, within a period, the synchronization frame sent by the base station. After receiving the synchronization frame, the WUR interface, in the active state, of the user equipment receives, within the period, the wake-up frame sent by the base station, and wakes up the main radio interface of the user equipment. The user equipment receives, within the period in which the main radio interface is in the active state, the updated system information sent by the base station. The updated system information includes a system information block (SIB) 1, and other system information (OSI). The OSI refers to SIBs 2 to 21, and the WUR interface is in an inactive state when the main radio interface is in the active state. In this way, power consumption of the UE is reduced. The active state may be represented by an on state, and the inactive state may be represented by an off state.

In Case 2, the wake-up frame must include the SI update indication, and the SI update indication is used to indicate that system information has been updated, to explicitly instruct the UE to wake up the main radio interface and update the system information. The wake-up frame may be a broadcast frame, or may be a multicast frame or a unicast frame, which is not limited in this embodiment of this application.

Case 3: When the wake-up signal is the synchronization frame, that the WUR interface of the user equipment receives the wake-up signal sent by the base station includes: the WUR interface of the user equipment receives the synchronization frame sent by the base station, where the synchronization frame includes the SI update transmission control information.

Figure 7:
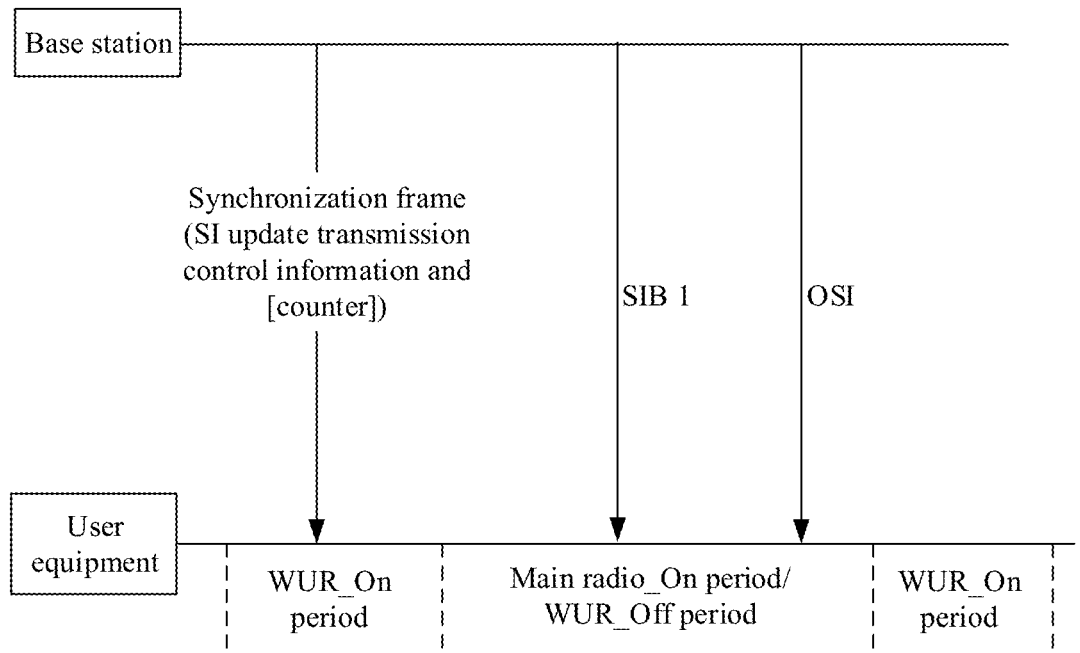
FIG. 7 is a flowchart of yet another system information updating method according to an embodiment of this application.

Specifically, a system information updating interaction process between the base station and the user equipment in Case 1 may be shown in FIG. 7.

The WUR interface, in an active state, of the user equipment receives, within a period, the synchronization frame sent by the base station, and wakes up the main radio interface of the user equipment when the synchronization frame carries the SI update transmission control information. The user equipment receives, within the period in which the main radio interface is in the active state, the updated system information sent by the base station. The updated system information includes a system information block (SIB) 1, and other system information (OSI). The OSI refers to SIBs 2 to 21, and the WUR interface is in an inactive state when the main radio interface is in the active state. In this way, power consumption of the UE is reduced. The active state may be represented by an on state, and the inactive state may be represented by an off state. When the synchronization frame does not carry the SI update transmission control information, the UE considers that the current system information has not changed and does not perform the operation of waking up the main radio interface. This implementation is an implicit indication that instructs whether to wake up the main radio interface through the synchronization frame.

Optionally, the synchronization frame further includes an SI update indication, and the SI update indication is used to indicate that system information has been updated. Specifically, the SI update indication is carried by a counter counter field, and a value of the counter field is used to indicate that system information has been updated. If the value of the counter field is different from a counter value prestored by the user equipment, the system information has changed; if the value of the counter field is the same as a counter value prestored by the user equipment, the system information has not changed. This implementation is an explicit indication.

For example, if the synchronization frame carries the SI update transmission control information, and the value of the counter field is different from the local counter value previously stored by the UE, it is considered that the system information has changed, and the UE wakes up the main radio interface to receive the updated system information by using the indicated SI update transmission control information.

Figure 8:
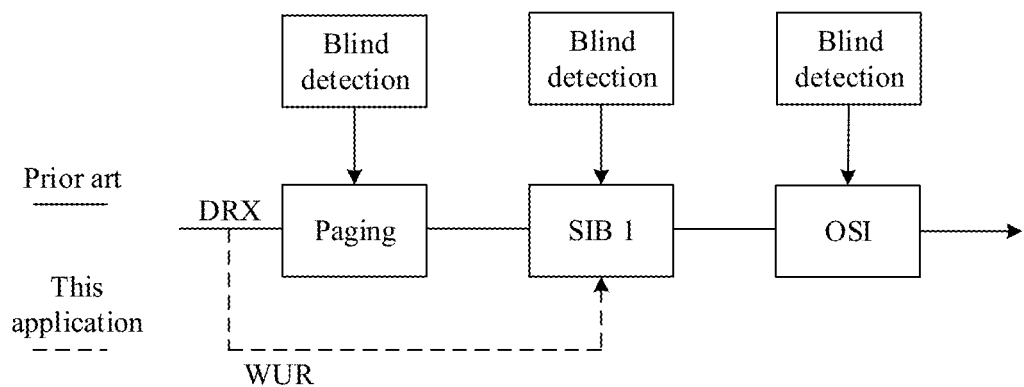
FIG. 8 is a schematic diagram of receiving updated system information according to a prior art and an embodiment of this application.

In this embodiment of this application, how system information is updated is described through the foregoing three cases. With the foregoing implementations, the UE avoids a large quantity of prior-art blind detection processes of first performing blind detection to receive a paging message and then performing blind detection to receive the system information block 1, and may directly receive the updated SIB 1 according to the required information. This reduces power consumption of the UE. Specifically, a schematic diagram of receiving the updated system information in the prior art and this application is shown in FIG. 8.

In an optional implementation, if the synchronization frame does not carry the SI update transmission control information, and the value of the counter field is different from the local counter value previously stored by the UE, it is considered that the system information has changed. In this case, because neither the synchronization frame nor the wake-up frame carries the SI update transmission control information, the UE wakes up the main radio interface to directly obtain SI transmission resource information by using a system information radio network temporary identity (SI-RNTI) to descramble a physical downlink control channel.

Figure 9:
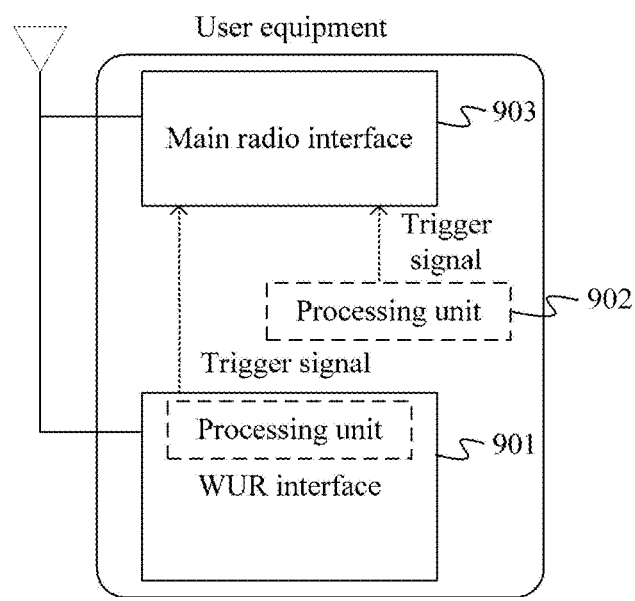
FIG. 9 is a schematic diagram of a user equipment apparatus according to an embodiment of this application.

Based on the same inventive concept as the method embodiment, this application further provides a possible schematic diagram of user equipment. As shown in FIG. 9, the user equipment includes: a WUR interface 901, configured to receive a wake-up signal sent by a base station, where the wake-up signal is used to instruct the user equipment to wake up a main radio interface of the user equipment and instruct the main radio interface of the user equipment to receive updated system information, the wake-up signal includes system information SI update transmission control information, and the SI update transmission control information includes information required for receiving the updated system information; and a processing unit 902 (which may specifically be a processor), configured to wake up the main radio interface of the user equipment after the WUR interface receives the wake-up signal, where the processing unit 902 may be a processing unit or processor in the WUR interface of the user equipment, or may be a processor of the user equipment (that is, a processor in the user equipment that is independent of the WUR interface of the user equipment); the main radio interface 903, configured to, after being woken up by the processing unit 902, receive, according to the SI update transmission control information, the updated system information sent by the base station. A trigger signal shown in FIG. 9 may have alternative names, for example, a trigger message, and is used to wake up the main radio interface. In some embodiments, the WUR interface may send a trigger signal to the main radio interface, or the WUR interface may forward a received wake-up signal to the processor, and the processor determines whether to wake up the main radio module. In this case, the trigger signal is actually sent by the processor, or sent by the WUR interface or another module under instruction of the processor. The main radio interface 903 may be, for example, directly woken up by the trigger signal sent by the processor of the user equipment, or indirectly woken up by the processor of the user equipment through the WUR interface, or directly woken up by the WUR interface, or indirectly woken up by the WUR interface through the processor of the user equipment, which is not limited in this application.

Figure 10:
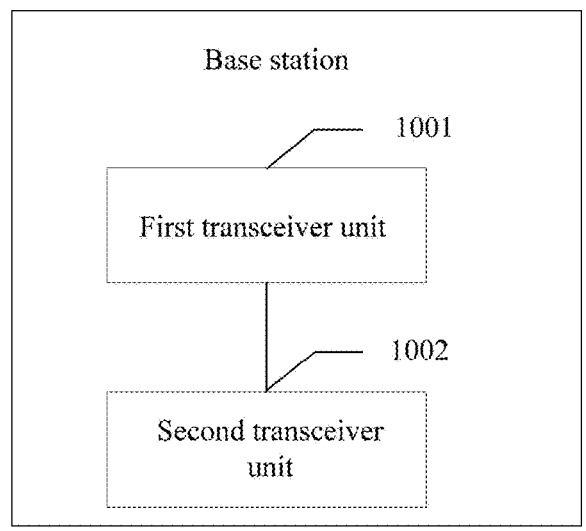
FIG. 10 is a schematic diagram of a base station apparatus according to an embodiment of this application.

Based on the same inventive concept as the method embodiment, this application further provides a schematic diagram of a base station. As shown in FIG. 10, the base station includes: a first transceiver unit 1001, configured to send a wake-up signal, where the wake-up signal is used to instruct the user equipment to wake up a main radio interface of the user equipment and instruct the main radio interface of the user equipment to receive updated system information, the wake-up signal includes system information SI update transmission control information, the SI update transmission control information includes information required for receiving the updated system information, where, in one embodiment, the first transceiver unit 1001 may be a WUR interface of the base station, and in another embodiment, the first transceiver unit 1001 may be a main radio interface of the base station; and a second transceiver unit 1002, configured to send the updated system information to the woken-up main radio interface of the user equipment, where the second transceiver unit may be the main radio interface of the base station. For a structure of the base station in an embodiment, reference may be made to the structure of the user equipment in FIG. 9.

In embodiments of this application, the module division is an example and merely logical function division, and there may be another division manner in actual implementation. In addition, the functional modules in the embodiments of this application may be integrated into one processor, or each of the modules may exist alone physically, or two or more modules may be integrated into one module. The integrated module may be implemented in a form of hardware, or may be implemented in a form of a software functional module.

Figure 11:
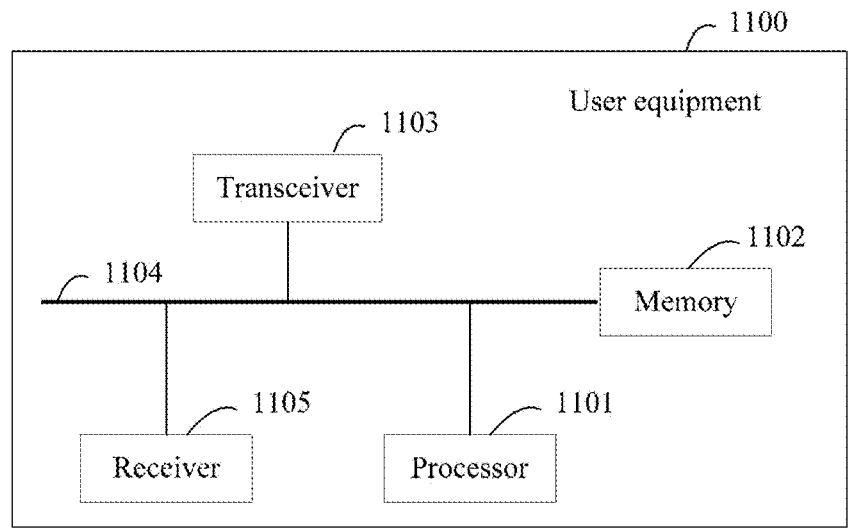
FIG. 11 is a diagram of a hardware structure of user equipment according to an embodiment of this application.

The user equipment in this application may also be shown in FIG. 11. Referring to FIG. 11, UE 1100 may include a processor 1101, a memory 1102, a transceiver 1103, a receiver 1105, and a bus 1104. The transceiver 1103 is configured as a main communications interface for sending and receiving a signal (for example, an LTE/NR signal) to and from the main communications interface, and the receiver 1105 is configured as a WUR interface for receiving a wake-up signal. The processor 1101, the memory 1102, and the transceiver 1103 are connected to each other through the bus 1104. The bus 1104 may be a PCI bus, an EISA bus, or the like. The bus 1104 may be classified into an address bus, a data bus, a control bus, and the like. For ease of representation, only one thick line is used to represent the bus in FIG. 11, but this does not mean that there is only one bus or only one type of bus.

An embodiment of this application further provides a non-volatile storage medium. The non-volatile storage medium stores one or more pieces of program code. When the processor 1101 of the user equipment 1100 executes the program code, the user equipment 1100 executes related method steps performed by the user equipment in any one of the method embodiments of this application.

The user equipment 1100 provided in this embodiment of this application can execute the related method steps performed by the user equipment in any one of the method embodiments of this application. For the detailed description of the modules and technical effects brought by performing, by the modules, the related method steps performed by the user equipment in any one of the method embodiments of this application, reference may be made to the related descriptions in the method embodiments of this application, and details are not described herein again.

Figure 12:
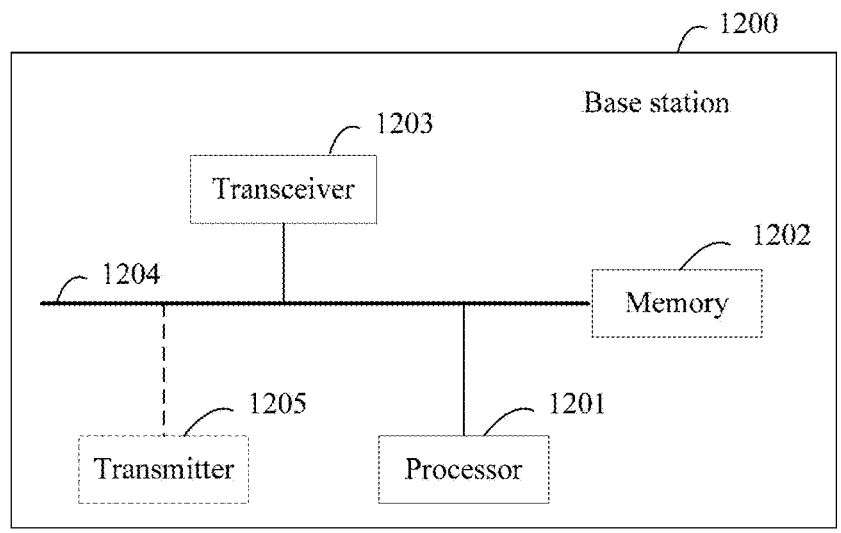
FIG. 12 is a diagram of a hardware structure of a base station according to an embodiment of this application.

The base station in this application may also be shown in FIG. 12. Referring to FIG. 12, a base station 1200 may include a processor 1201, a memory 1202, a transceiver 1203, and a bus 1204. The transceiver 1203 is configured as a main communications interface for sending and receiving a signal (for example, an LTE/NR signal) to and from the main communications interface. In an embodiment, the transceiver 1203 is configured as the main communications interface and may also be configured to send a wake-up signal. The processor 1201, the memory 1202, and the transceiver 1203 are connected to each other through the bus 1204. The system bus 1204 may be a peripheral component interconnect (PCI for short) bus, an extended industry standard architecture (EISA for short) bus, and or the like. The bus 1204 may be classified into an address bus, a data bus, a control bus, and the like. For ease of representation, only one thick line is used to represent the bus in FIG. 12, but this does not mean that there is only one bus or only one type of bus. In some embodiments, the base station 1200 may further include a receiver, which may specifically be a WUR interface, configured to receive a WUR signal or message.

If the WUR interface has a capability of sending a WUR signal or message and does not need to send the WUR signal or message through the main communications interface, in some other embodiments, the base station 1200 shown in FIG. 12 may further include a transmitter 1205. The transceiver 1203 is configured as a main communications interface (in other words, a main communications interface may be used to substitute for the transceiver 1203) for sending and receiving a signal (for example, an LTE/NR signal) to and from the main communications interface, and the transmitter 1205 is configured as a WUR interface (in other words, a WUR interface may be used to substitute for the transmitter 1205) for sending the wake-up signal.

This application further provides a non-volatile storage medium. The non-volatile storage medium stores one or more pieces of program code. When the processor 1201 of the base station 1200 executes the program code, the base station 1200 executes related method steps performed by the base station in any one of the method embodiments of this application.

The base station 1200 provided in this embodiment of this application can execute the related method steps performed by the base station in any one of the method embodiments of this application. For the detailed description of the modules or units and technical effects brought by performing, by the modules or units, the related method steps performed by the base station in any one of the method embodiments of this application, reference may be made to the related descriptions in the method embodiments of this application, and details are not described herein again.

Figure 13:
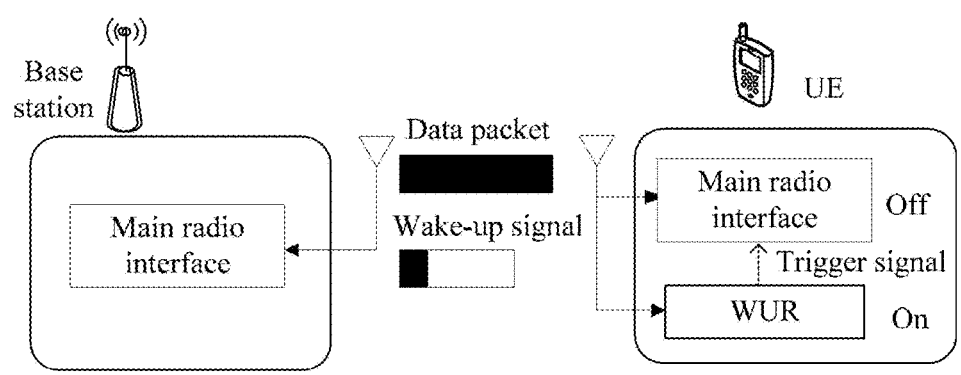
FIG. 13 is a schematic diagram of a system according to an embodiment of this application.

A schematic diagram of a system including the base station and the user equipment according to the embodiments of this application may be shown in FIG. 13.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

In the embodiments of this application, the base station may be referred to as a network device, and the user equipment may be referred to as a terminal device.

An embodiment of this application provides a network device. The network device provides functions of implementing the behaviors of the network device in any one of the foregoing method embodiments. The functions may be implemented through hardware, or may be implemented by executing corresponding software by the hardware. The hardware or software includes one or more modules that correspond to sub-functions of the foregoing functions. Optionally, the network device may be a base station.

An embodiment of this application provides a terminal device. The terminal device provides functions of implementing the behaviors of the terminal device in any one of the foregoing method embodiments. The functions may be implemented through hardware, or may be implemented by executing corresponding software by the hardware. The hardware or software includes one or more modules that correspond to sub-functions of the foregoing functions. Optionally, the terminal device may be user equipment.

An embodiment of this application further provides a communications system, and the system includes the network device and the terminal device that are described in any one of the foregoing embodiments.

An embodiment of this application further provides a computer-readable storage medium in which a computer program is stored. When the computer program is executed by a computer, a method process related to the terminal device in any of the foregoing method embodiments is implemented. Specifically, the computer may be the foregoing terminal device.

An embodiment of this application further provides a computer-readable storage medium on which a computer program is stored. When the computer program is executed by a computer, a method process related to the network device in any of the foregoing method embodiments is implemented. Specifically, the computer may be the foregoing network device.

An embodiment of this application further provides a computer program or a computer program product including a computer program. When the computer program is executed on a computer, the computer is enabled to implement a method process related to the terminal device in any one of the foregoing method embodiments. Specifically, the computer may be the foregoing terminal device.

An embodiment of this application further provides a computer program or a computer program product including a computer program. When the computer program is executed on a computer, the computer is enabled to implement a method process related to the network device in any one of the foregoing method embodiments. Specifically, the computer may be the foregoing network device.

An embodiment of this application further provides a chip, including a processing module and a communications interface. The processing module is capable of executing a method process related to the terminal device in any one of the foregoing method embodiments. Further, the chip further includes a storage module (for example, a memory). The storage module is configured to store an instruction. The processing module is configured to: execute the instruction stored in the storage module, and due to the execution of the instruction stored in the processing module, the processing module is enabled to execute a method process related to the terminal device in any one of the foregoing method embodiments. The chip may be a system on chip (SoC).

An embodiment of this application further provides a chip, including a processing module and a communications interface. The processing module is capable of executing a method process related to the network device in any one of the foregoing method embodiments. Further, the chip further includes a storage module (for example, a memory). The storage module is configured to store an instruction. The processing module is configured to: execute the instruction stored in the storage module, and due to the execution of the instruction stored in the processing module, the processing module is enabled to execute a method process related to the network device in any one of the foregoing method embodiments. The chip may be an SoC.

It should be understood that, the processor mentioned in the embodiments of this application may be a central processing unit (CPU), the processor may further be another general purpose processor, a digital signal processor (DSP), an application specific integrated circuit (ASIC), a field programmable gate array (FPGA), or another programmable logic device, discrete gate or transistor logic device, discrete hardware component, or the like. The general purpose processor may be a microprocessor, or the processor may be any conventional processor or the like.

It may be understood that the memory mentioned in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that the memory described in this specification is intended to include, but is not limited to, these memories and any other appropriate types of memories.

It should also be understood that the first, second, and other numerical numbers in this specification are only for ease of description and are not intended to limit the scope of this application.

The term "and/or" in this specification describes only an association relationship for describing associated objects and represents that three relationships may exist. For example, A and/or B may represent the following three cases: Only A exists, both A and B exist, and only B exists. In addition, the character "I" in this specification generally indicates an "or" relationship between the associated objects.

It should be understood that the sequence numbers of the foregoing processes do not mean execution sequences in the embodiments of this application. Some or all steps may be performed in parallel or in sequence. The execution sequences of the processes should be determined depending on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may or may not be physical units, and may be located in one position or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, a network device, or a terminal device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

Related parts of the method embodiments of this application may be mutually referenced. The apparatuses provided in the apparatus embodiments are configured to execute the methods provided in the corresponding method embodiments. Therefore, for the apparatus embodiments, reference may be made to the related parts in the related method embodiments.

The apparatus structural diagrams provided in the apparatus embodiments of this application merely show simplified designs of the corresponding apparatus. In practical application, the apparatus may include any quantity of transmitters, receivers, processors, memories, and the like, to implement the functions or operations executed by the apparatus in the apparatus embodiments of this application, and all apparatuses that can implement this application fall within the scope of protection of this application.

Names of messages/frames/indication information, modules or units, and the like provided in the embodiments of this application are merely examples, and other names may be used provided that functions of the messages/frames/indication information, the modules or units, and the like are the same.

The terms used in the embodiments of this application are merely for the purpose of illustrating specific embodiments, and are not intended to limit this application. The terms "a", "said" and "the" of singular forms used in the embodiments and the appended claims of this application are also intended to include plural forms, unless otherwise specified in the context clearly. It should also be understood that, the term "and/or" used herein indicates and includes any or all possible combinations of one or more associated listed items. In addition, the character "/" in this specification generally indicates an "or" relationship between the associated objects.

Depending on the context, for example, words "if" used herein may be explained as "while" or "when" or "in response to determining" or "in response to detection".

Similarly, depending on the context, phrases "if determining" or "if detecting (a stated condition or event)" may be explained as "when determining" or "in response to determining" or "when detecting (the stated condition or event)" or "in response to detecting (the stated condition or event)".

A person of ordinary skill in the art can understand that all or some of the steps in the foregoing method embodiments may be completed by a program instructing related hardware. The program may be stored in a readable storage medium of a device. All or some of the steps are included during execution of the program. The storage medium is, for example, a flash drive or an EEPROM.

In the foregoing specific implementations, the objective, technical solutions, and benefits of this application have been further described in detail. It should be understood that different embodiments can be combined. The foregoing descriptions are merely specific implementations of this application, but are not intended to limit the protection scope of this application. Any combination, modification, equivalent replacement, or improvement made without departing from the spirit and principle of this application should fall within the protection scope of this application.

What is claimed is:

1. A system information updating method comprising:
receiving, by a wake-up radio (WUR) interface of user equipment, a wake-up signal sent by a base station, wherein the wake-up signal comprises system information (SI) update indication information, and the SI update indication information is used to instruct the user equipment to receive updated system information through a main interface of the user equipment; and
receiving, by the user equipment according to the SI update indication information through the main interface of the user equipment, the updated system information sent by the base station.

2. The method according to claim 1, wherein the SI update indication information comprises frequency domain resource information required for receiving the updated system information.

3. The method according to claim 2, wherein the SI update indication information further comprises at least one of the following information: time domain resource information required for receiving the updated system information, and modulation and coding scheme information required for receiving the updated system information.

4. The method according to claim 1, wherein the wake-up signal is a synchronization frame and/or a wake-up frame, and the wake-up frame is a broadcast frame, a unicast frame, or a multicast frame.

5. A system information updating method comprising:
sending, by a base station, a wake-up signal to a wake-up radio (WUR) interface of user equipment, wherein the wake-up signal comprises system information (SI) update indication information, and the SI update indication information is used to instruct the user equipment to receive updated system information through a main interface of the user equipment; and
sending, by the base station, the updated system information to the main interface of the user equipment.

6. The method according to claim 5, wherein the SI update indication information comprises frequency domain resource information required for receiving the updated system information.

7. The method according to claim 6, wherein the SI update indication information further comprises at least one of the following information: time domain resource information required for receiving the updated system information, and modulation and coding scheme information required for receiving the updated system information.

8. The method according to claim 5, wherein the wake-up signal is a synchronization frame and/or a wake-up frame, and the wake-up frame is a broadcast frame, a unicast frame, or a multicast frame.

9. The method according to claim 8, wherein based on the wake-up signal being the wake-up frame, the sending, by the base station, the wake-up signal to the WUR interface of the user equipment comprises:
sending, by the base station, the wake-up frame to the WUR interface of the user equipment, wherein the wake-up frame comprises the SI update indication information.

10. An apparatus, comprising: one or more processors configured to receive a wake-up signal sent by a base station, wherein the wake-up signal comprises system information (SI) update indication information, and the SI update indication information is used to instruct the user equipment to receive updated system information through a main interface of the user equipment; and
receive, according to the SI update indication information, the updated system information sent by the base station.

11. The apparatus according to claim 10, wherein the SI update indication information comprises frequency domain resource information required for receiving the updated system information.

12. The apparatus according to claim 11, wherein the SI update indication information further comprises at least one of the following information: time domain resource information required for receiving the updated system information, and modulation and coding scheme information required for receiving the updated system information.

13. The apparatus according to claim 10, wherein the wake-up signal is a synchronization frame and/or a wake-up frame, and the wake-up frame is a broadcast frame, a unicast frame, or a multicast frame.

14. The apparatus according to claim 13, wherein based on the wake-up signal being the wake-up frame, the one or more processors further configured to:
receive the wake-up frame sent by the base station, wherein the wake-up frame comprises the SI update indication information.

15. The apparatus according to claim 13, wherein based on the wake-up signal being the synchronization frame and the wake-up frame, the one or more processors are further configured to:
receive the synchronization frame sent by the base station, wherein the synchronization frame comprises the SI update indication information; and
after receiving the synchronization frame sent by the base station, receive, the wake-up frame sent by the base station, wherein the wake-up frame comprises an SI update indication, and the SI update indication is used to indicate that system information has been updated.

16. An apparatus, comprising:
a first transceiver, configured to send a wake-up signal, wherein the wake-up signal comprises system information (SI) update indication information, and the SI update indication information is used to instruct the user equipment to receive updated system information through a main interface of the user equipment; and
a second transceiver, configured to send updated system information to the main interface of the user equipment.

17. The apparatus according to claim 16, wherein the SI update indication information comprises frequency domain resource information required for receiving the updated system information.

18. The apparatus according to claim 17, wherein the SI update indication information further comprises at least one of the following information: time domain resource information required for receiving the updated system information, and modulation and coding scheme information required for receiving the updated system information.

19. The apparatus according to claim 16, wherein the wake-up signal is a synchronization frame and/or a wake-up frame, and the wake-up frame is a broadcast frame, a unicast frame, or a multicast frame.

20. A system comprising: a base station and user equipment, wherein the user equipment is configured to receive a wake-up signal sent by the base station, wherein the wake-up signal comprises system information (SI) update indication information, and the SI update indication information is used to instruct the user equipment to receive updated system information through a main interface of the user equipment; and receive, according to the SI update indication information through the main interface, the updated system information sent by the base station; and the base station is configured to: send the wake-up signal, wherein the wake-up signal comprises the SI update indication information; and send the system information to the main interface of the user equipment.

\* \* \* \* \*